US005995728A

United States Patent [19]

Forman

[11] Patent Number: 5,995,728

[45] Date of Patent: Nov. 30, 1999

[54] COMPUTER IMPLEMENTED METHOD OF GENERATING AND DISPLAYING OBJECTIVES FROM PROS AND CONS FOR EVALUATING DECISION ALTERNATIVES

[76] Inventor: Ernest H. Forman, 1438 Ironwood Dr., McLean, Va. 22101

[21] Appl. No.: 08/651,099

[22] Filed: May 21, 1996

Related U.S. Application Data

[60] Provisional application No. 60/000,608, Jun. 30, 1995.

[51] Int. Cl.[6] ................................ G06F 3/14; G06F 9/00

[52] U.S. Cl. .......................... 395/500; 395/357; 395/353

[58] Field of Search .................................... 395/500, 353, 395/356, 357; 345/135; 705/7, 10

[56] References Cited

U.S. PATENT DOCUMENTS

| | | | |
|---|---|---|---|
| 4,613,946 | 9/1986 | Forman | 364/518 |
| 5,312,114 | 5/1994 | Lipson | 273/429 |
| 5,325,533 | 6/1994 | McInerney et al. | 395/701 |
| 5,559,945 | 9/1996 | Beaudet et al. | 395/353 |
| 5,621,905 | 4/1997 | Jewson et al. | 395/353 |
| 5,625,781 | 4/1997 | Cline et al. | 395/357 |
| 5,630,120 | 5/1997 | Vachey | 395/602 |
| 5,644,736 | 7/1997 | Healy et al. | 395/357 |
| 5,644,740 | 7/1997 | Kiuchi | 395/356 |
| 5,657,437 | 8/1997 | Bishop et al. | 395/356 |

*Primary Examiner*—Kevin J. Teska
*Assistant Examiner*—Tyrone V. Walker

[57] ABSTRACT

A computer implemented method to generate and display objectives for evaluating decision alternatives is disclosed. The method begins by computer system working interactively with the decision maker in identifying and displaying alternative solutions to a decision. Pros and cons of the alternatives are then identified by the decision maker with the assistance of the computer and displayed by the computer. Significantly, the pros and cons are used by the decision maker to identify and to be converted into objectives. The objectives, which are the key to a rational evaluation of the alternatives are then structured and displayed by the computer hierarchically in preparation for evaluation and choice by the decision maker. The decision maker then decides on a particular course of action based on the hierarchically displayed objectives.

8 Claims, 10 Drawing Sheets

| | Alternative Description | Abbreviation | Pros/Cons |
|---|---|---|---|
| 1 | Expand the company and build a new sub-division | EXPAND | Alt 1 |
| 2 | Make no plans or further inquiries for expansion at this time | WAIT IND | Alt 2 |
| 3 | Wait 6 months, meanwhile collecting additional informtion | WAIT 6 | Alt 3 |
| 4 | | | Alt 4 |
| 5 | | | Alt 5 |
| 6 | | | Alt 6 |
| 7 | | | Alt 7 |
| 8 | | | Alt 8 |
| 9 | | | Alt 9 |

FIG. 2

Decide whether to expand company

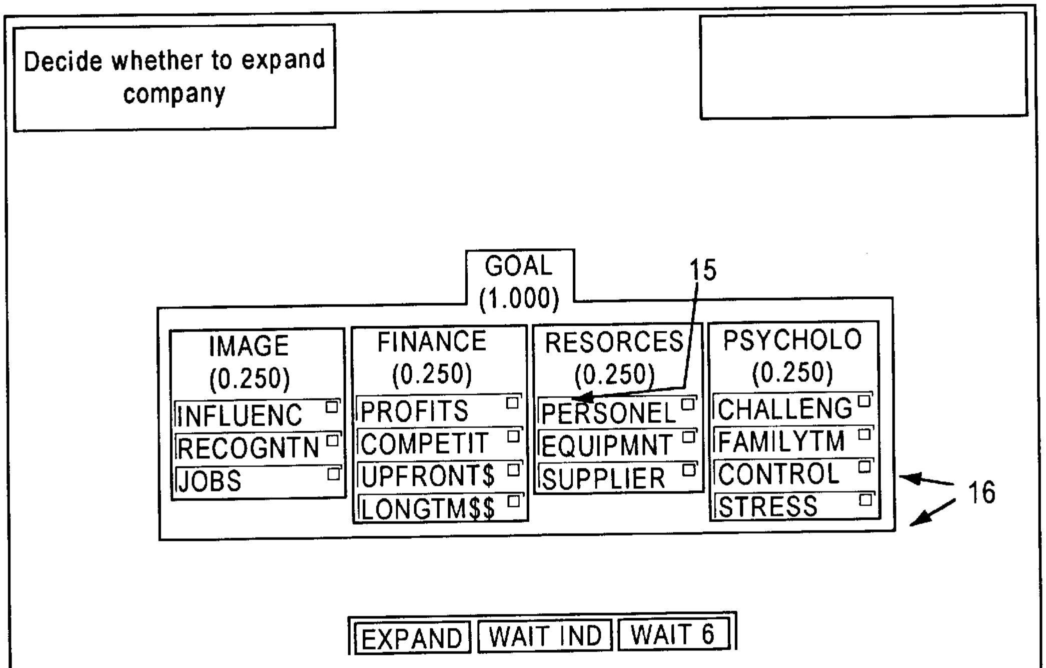

| Abbreviation | Definition |
|---|---|
| CHALENG | New Chalenges ← 17 |
| COMPETIT | Competitiveness |
| CONTROL | Maintain company control |
| EQUIPMNT | Need for new equipment |
| FAMILYTM | Time for family |
| FINANCE | Financial considerations |
| IMAGE | Company Image |
| INFLUENC | Influence community growth |
| JOBS | Increase jobs in community |
| LONGTM$$ | Ties up funds longterm |
| PERSONEL | Need to hire new people |
| PROFITS | Profits |
| PSYCHOLO | Psychological and personal effects of adding the sub-div |
| RECOGNTN | Get regional recognition for company |
| RESOUCES | Resources |
| STRESS | Stress from indecision |
| SUPPLIER | Need for new suppliers |
| UPFRONT$ | No upfront $ needed |

FIG. 9

COMPUTER IMPLEMENTED METHOD OF GENERATING AND DISPLAYING OBJECTIVES FROM PROS AND CONS FOR EVALUATING DECISION ALTERNATIVES

RELATD APPLICATIONS

This application claims priority from U.S. provisional application Ser. No. 60/000,608, filed on Jun. 30, 1995, the details of which (including all appendices) are incorporated herein by reference.

BACKGROUND OF THE INVENTION

The literature contains three different terms used to describe decision making methodologies: Multi-criteria decision making, Multi-attribute decision making, and Multi-objective decision making. Although these three terms are used interchangeably, we have found that in practice they are not interchangeable and have concluded that the decision making process is greatly facilitated by focusing on objectives. In some decision making contexts, the objectives are clear to the decision maker(s); in many other situations, they are not.

Generally, decision making becomes difficult when the decision maker is unable to intelligently identify objectives supporting a complex decision. In this situation, the decision maker is faced with an array of data supporting and opposing a particular decision. The decision maker generally becomes confused and focuses on one aspect or only a subset of the compiled data, essentially making the decision based on a "gut instinct" or "seat of the pants" approach. In this situation, the decision maker generally uses the compiled data to confirm an already decided course of action. That is, the decision maker is unable to make a truly objective decision.

We have found that the decision making process is greatly facilitated by constructing a meaningful list of objectives for use by the decision maker in selecting a particular course of action. To effectuate this emphasis on developing a meaningful list of objectives, a computer implemented system is utilized to prompt the decision maker to develop, enter and organize pros and cons that have been developed for a given decision to be made. Having developed an acceptable list of pros and cons, the computer implemented system prompts and assists the decision maker to convert the list of pros and cons into an acceptable list of objectives.

Utilizing this developed list of objectives, the decision making process is greatly facilitated, and the decision maker is able to effectuate a well-reasoned decision, and perform a course of action responsive to the selected decision. This invention is a computerized method to be used by decision makers in identifying and displaying their objectives, as well as selecting a specific course of action responsive thereto.

SUMMARY OF THE INVENTION

It is a feature and advantage of the present invention to provide a computer implemented and assisted decision making process.

It is another feature and advantage of the present invention to provide a computer implemented and assisted decision making process whereby the decision maker is required to perform or execute a predefined set of steps or operations to arrive at a reasoned list of objectives that may be used in the decision making process.

It is another feature and advantage of the present invention to provide a computer implemented and assisted decision making process whereby the decision maker is required to perform or execute a predefined set of steps or operations which facilitate the identification and conversion of pros and cons of different decision alternatives into objectives to utilize as a basis for making a specific decision and performing a corresponding course of action.

It is another feature and advantage of the present invention to provide a computer implemented and assisted decision making process whereby the decision maker is required to perform or execute a predefined set of steps or operations which facilitate the decision making process.

It is another feature and advantage of the present invention to provide a computer implemented and assisted decision making process whereby the decision maker interacts with the computer system utilizing an effective and efficient user interface.

It is another feature and advantage of the present invention to provide a computer implemented and assisted decision making process whereby the user interface is designed in a manner that displays and prompts the decision maker with the information necessary to make the required decision in an effective and easily understood manner.

The computer implemented method begins with the decision maker(s) identifying and listing the alternative solutions or objectives to a problem. The present invention is based, in part, on our identification of the current problems existing in the decision making processes. We have found that converting the pros and cons of the alternatives under consideration to objectives, a process greatly facilitated with the use of a computer, greatly facilitates the decision making process.

Typically, objectives are elicited in a "top down" fashion, starting from the overall goal, to major objectives, sub objectives, sub-sub objectives and so on. An alternative or complimentary approach is a "bottom up approach". Pros and cons for each alternative are elicited. (Note: pros and cons have been used in decision making at least as far back as Benjamin Franklin's time, but have not been formally used to identify objectives).

After identifying the pros and cons for each alternative, the pros and cons are put in a "pro\con" list. Each pro and con is then considered in the following context: What objective(s) does this pro or con "point to? Each pro or con will always "point" to at least one objective. The objectives are then structured into a hierarchy.

The alternatives are then appended to the bottom level of the hierarchy for subsequent evaluation and choice. The display of the hierarchy uses U.S. Pat. No. 4,613,946 for hierarchical structure, incorporated herein by reference.

A computer implemented method interacts with a user to generate, organize, and display alternatives, pros, cons and objectives for evaluating decision alternatives. The computer implemented method includes the steps of generating and displaying a first list of the alternatives, and generating and displaying a second list of the pros and the cons corresponding to each of the alternatives arranged with reference to the alternatives. The computer implemented method also includes the steps of aggregating the pros and the cons under the control of a decision maker, and generating and displaying a third list of the pros and the cons arranged with reference to the pros and the cons, and prompting the decision maker to enter each of the pros and the cons into an objectives hierarchy by prompting the decision maker for an objective corresponding to the entered pros and/or cons. The computer implemented method also includes the steps of arranging and/or rearranging the objectives hierarchy by clustering objectives into objective groups including sub-objectives, displaying the objectives hierarchy in either a treeview and/or a clusterview in combination with the alternatives, and alternatively adding additional alternatives, pros, cons and objectives, and repeating the above steps.

A computer implemented method interacts with a user to generate, organize, and display alternatives, pros, cons and objectives for evaluating decision alternatives. The computer implemented method includes the steps of generating and displaying a first list of the alternatives, and generating and displaying a second list of the pros and the cons corresponding to each of the alternatives arranged with reference to the alternatives. The computer implemented method also includes the steps of aggregating the pros and the cons under the control of a decision maker, and generating and displaying a third list of the pros and the cons arranged with reference to the pros and the cons, and prompting the decision maker for an objective corresponding to the entered pros and/or cons. The computer implemented method also includes the steps of prompting the decision maker to enter each of the pros and the cons into an objectives hierarchy, converting each of the pros and the cons into a corresponding objective, and displaying the objectives hierarchy in at least one of a treeview or a clusterview in combination with the alternatives.

BREIF DESCRIPTION OF THE DRAWINGS

Additional objects and features of the invention will be more readily apparent from the following detailed description and appended claims when taken in conjunction with the drawings, in which:

FIG. 2 is a screen showing alternative solutions to a decision of deciding whether to expand a company;

FIG. 9 shows the resulting evaluation and choice model.

DETAILED DESCRIPTION OF THE PREFERRED EBODIMENT

The computer implemented method begins with the decision maker(s) identifying and listing the alternatives solutions to a problem and entering these alternative solutions into the computer system via the customized computer interface (FIG. 2). The computer system can be a general purpose personal computer, including, for example, a 486 type microprocess or pentium processor, and standard storage mediums typically used in connection therewith (RAM, ROM, hard disk drive, floppy disk drive, and the like).

Figure 3:
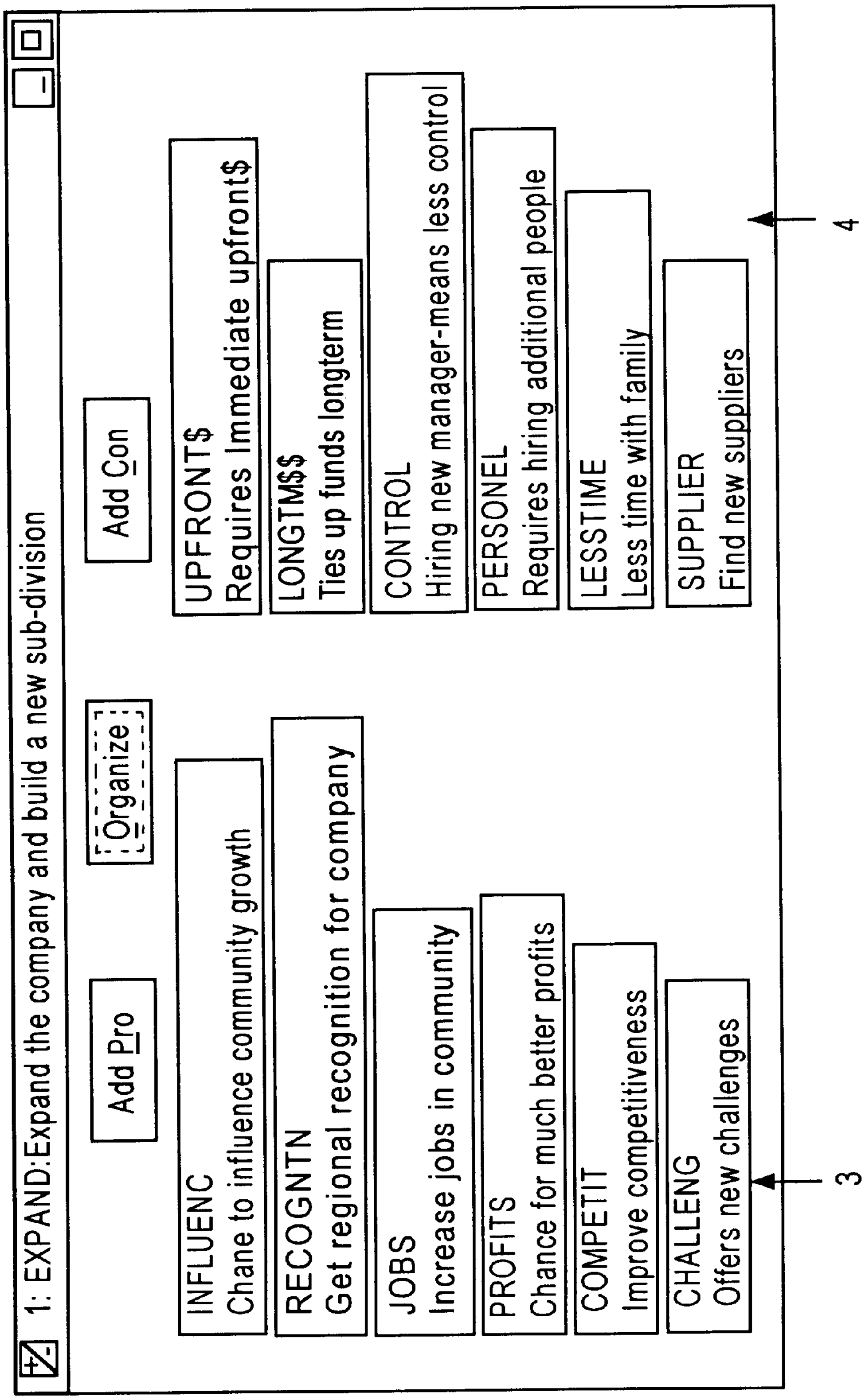
FIG. 3 is an illustration showing pros and cons for one of the alternatives.

While identifying the pros and cons for each alternative, the pros and cons are entered with respect to each alternative by the decision maker into the computer system via the customized user interface in a "pro-con" list (FIG. 3).

Figure 4:
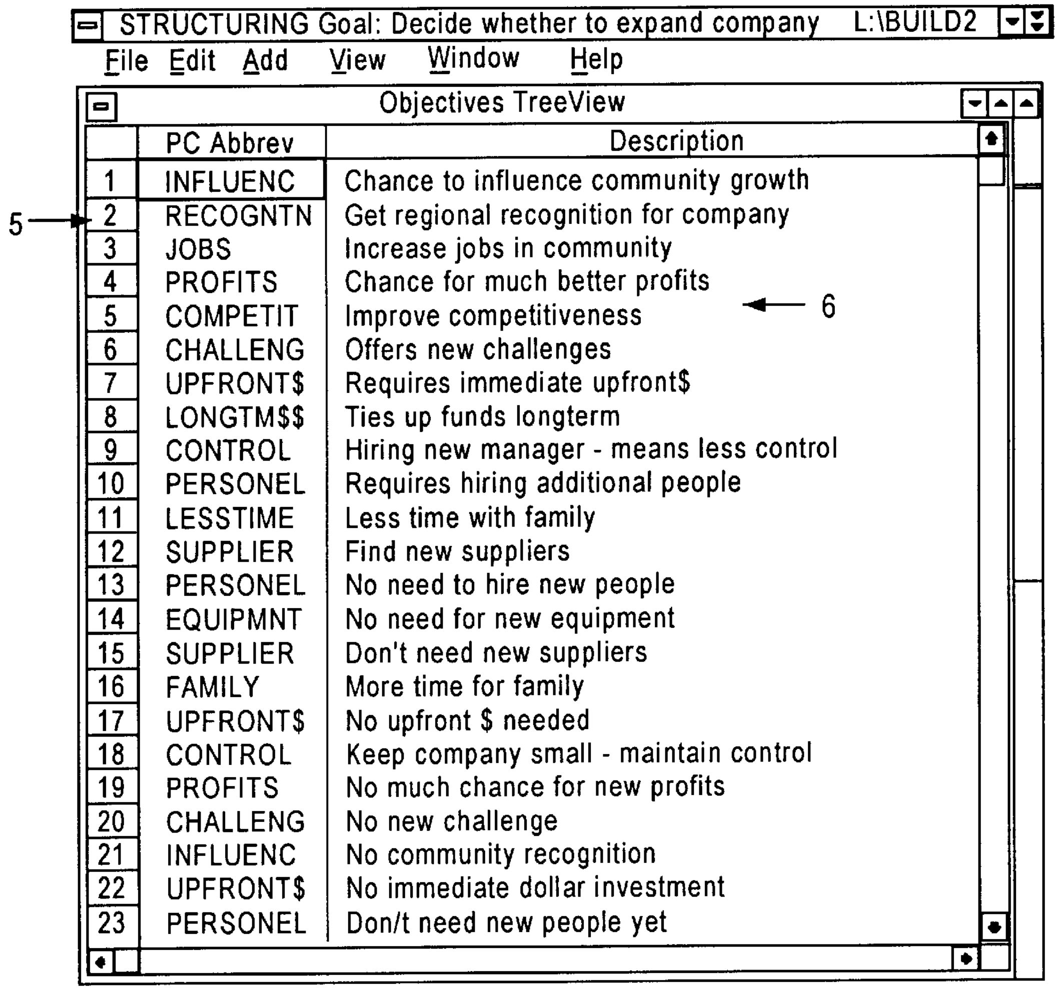
FIG. 4 is a list of the pros and cons from all alternatives.
Figure 5:
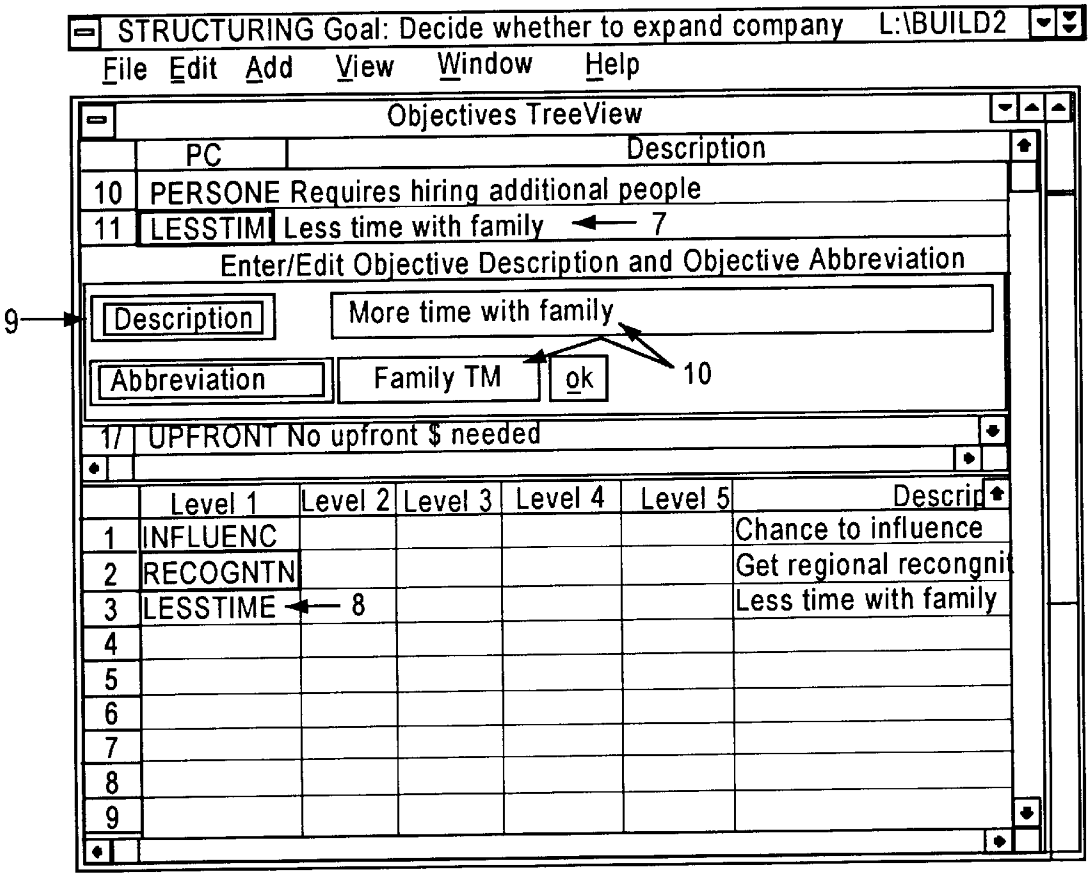
FIG. 5 shows how a pro/con is dropped into the objectives hierarchy.

The computer system then rearranges the pro-con list into a sequential listing of pros and cons with the associated detailed description (FIG. 4). Each pro and con is then considered in the following context: What objective(s) does this pro or con "point" to? Each pro or con will always "point" to at least one objective. The computer system then displays each of the pros and cons to the decision maker one-by-one as an objective, prompting the decision maker to convert each pro and/or con into an objective (FIG. 5).

Figure 6:
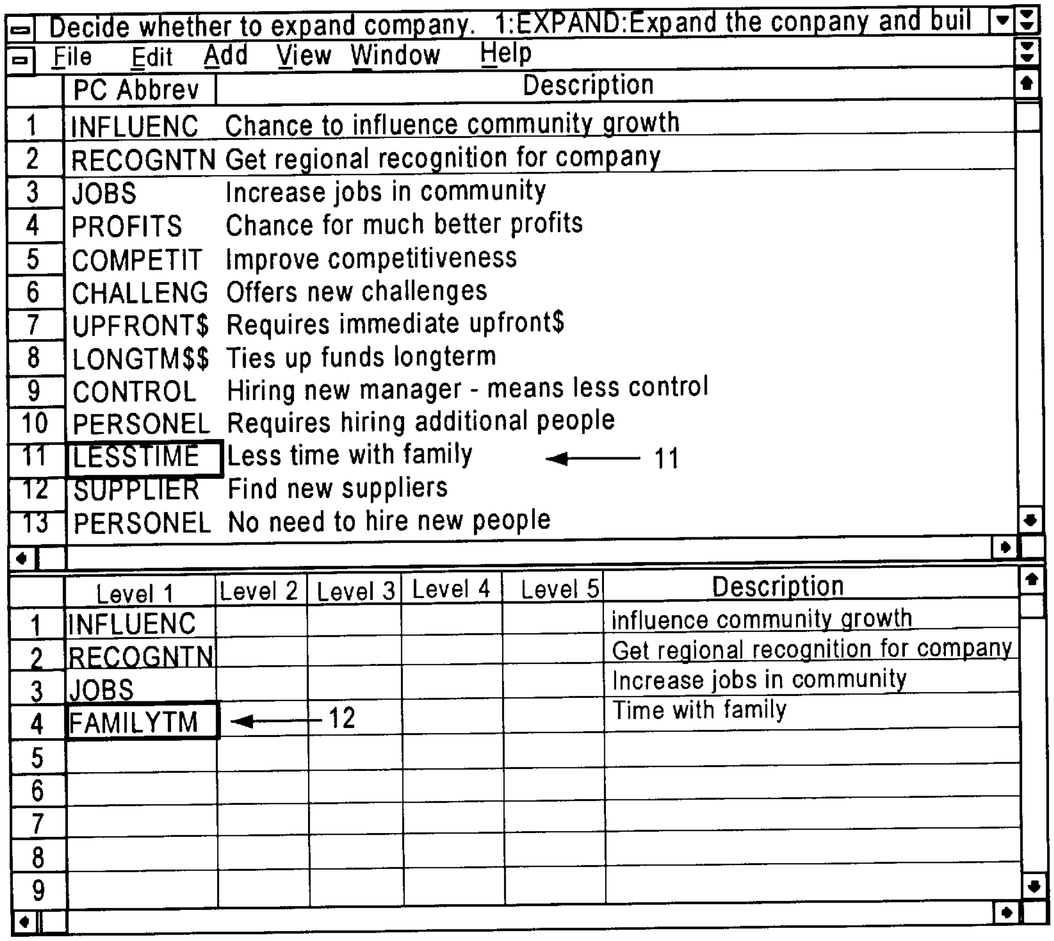
FIG. 6 shows how a pro/con is converted into an objective.
Figure 7:
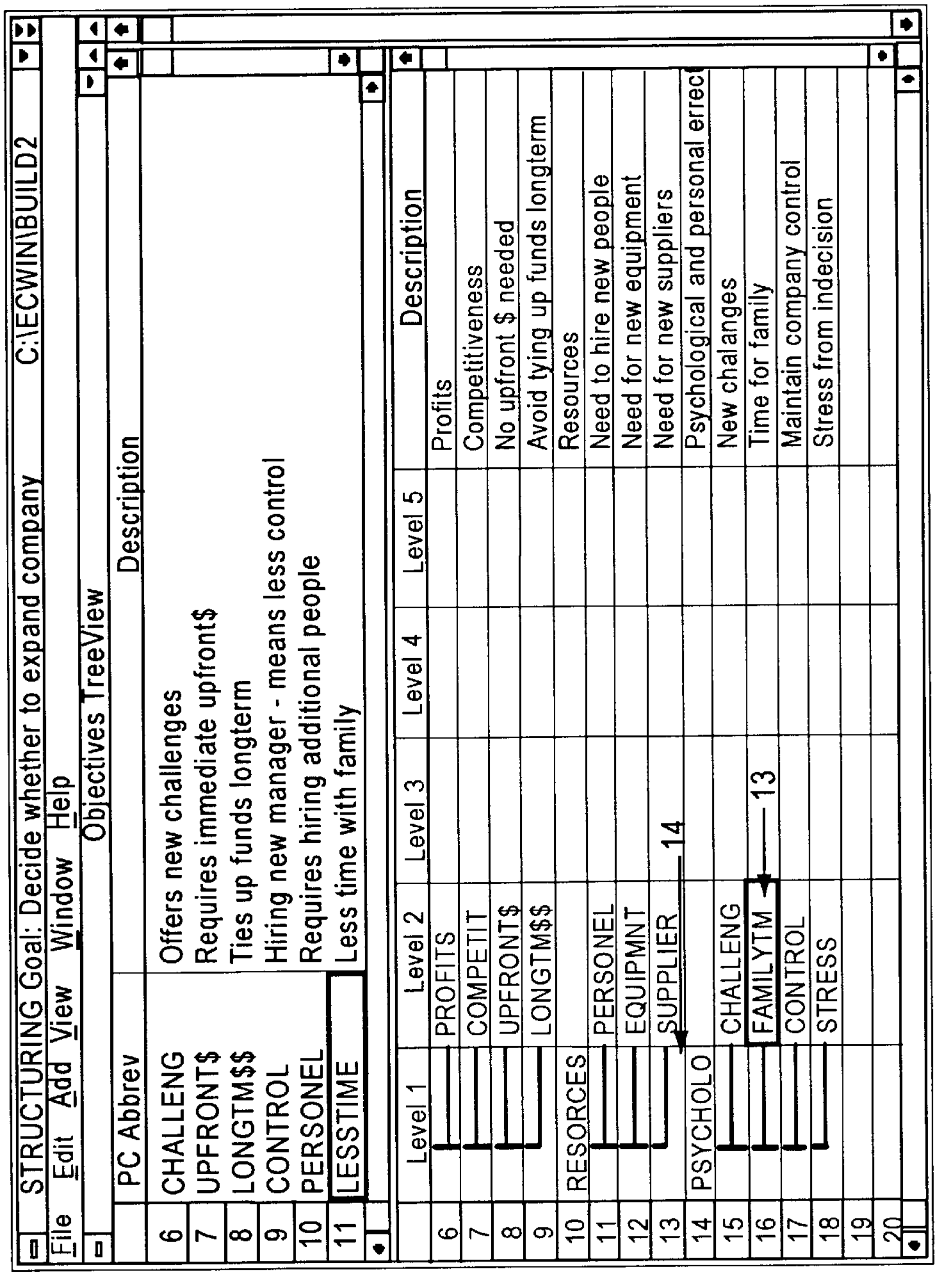
FIG. 7 shows a treeview of the structuring of objectives into a hierarchy.
Figure 8:
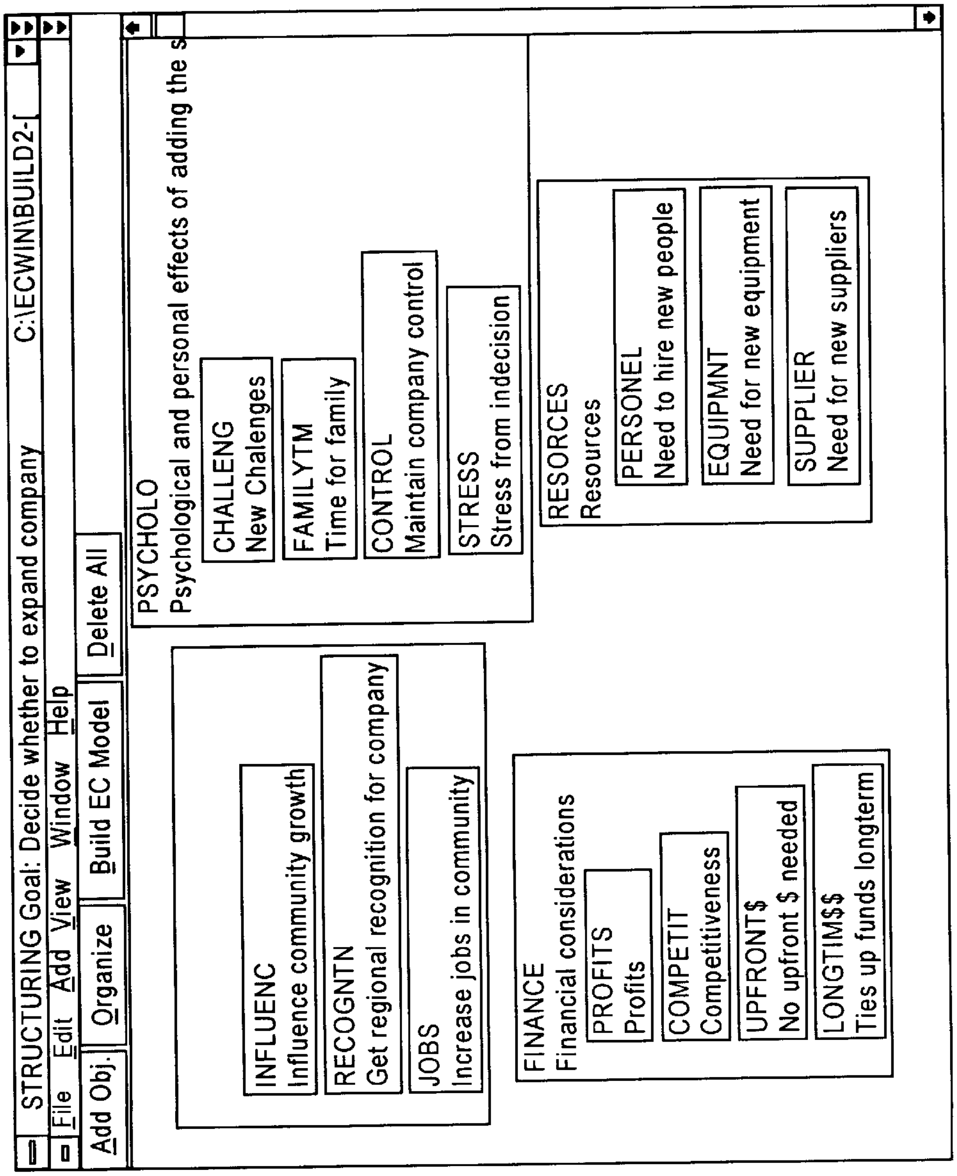
FIG. 8 shows a hierarchy of objectives in the form of a clusterview.

The decision maker responds to the prompt for an objective pointed at by the pro or con by entering the objective (FIG. 6). The computer system then adds the entered objective (i.e., the converted pro or con) to a list of objectives if the objective was not specified previously. The objectives are then structured by the computer system into a hierarchy (FIGS. 7–8). Typically, objectives are elicited in a "top down" fashion, starting from the overall goal, to major objectives, sub objectives, sub-sub objectives and so on. The alternatives are then appended by the computer system to the bottom level of the hierarchy for subsequent evaluation and choice (FIG. 9).

Figure 1A:
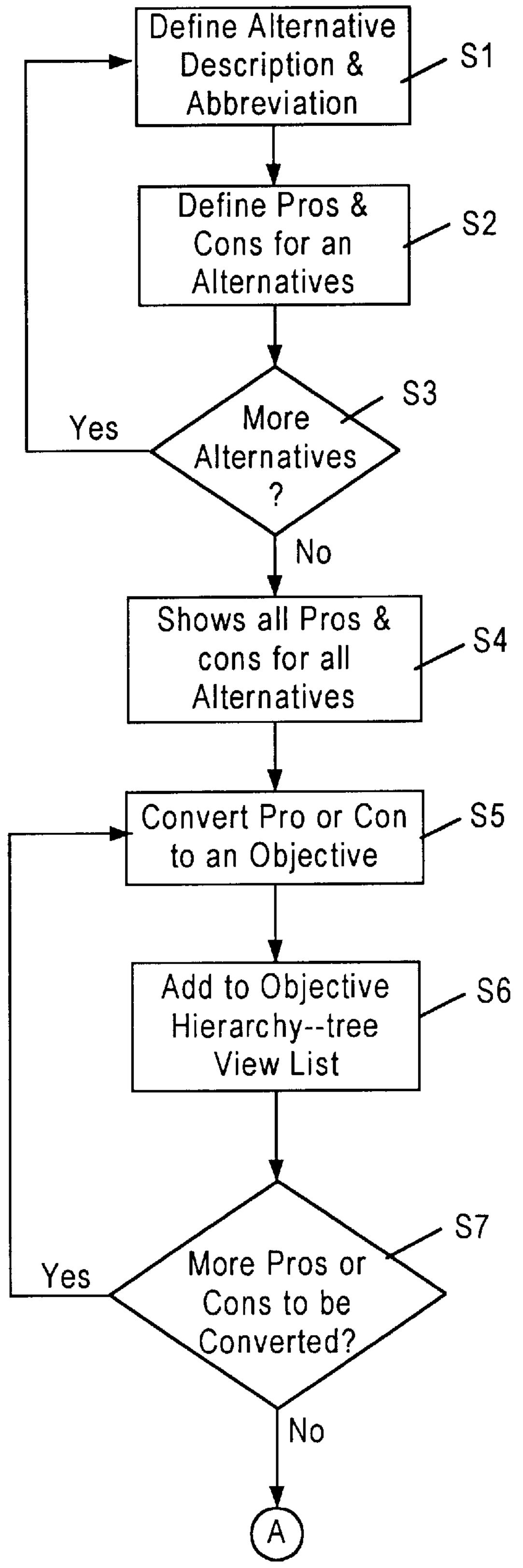
FIGS. 1A and 1B are flow charts of the process.
Figure 1B:
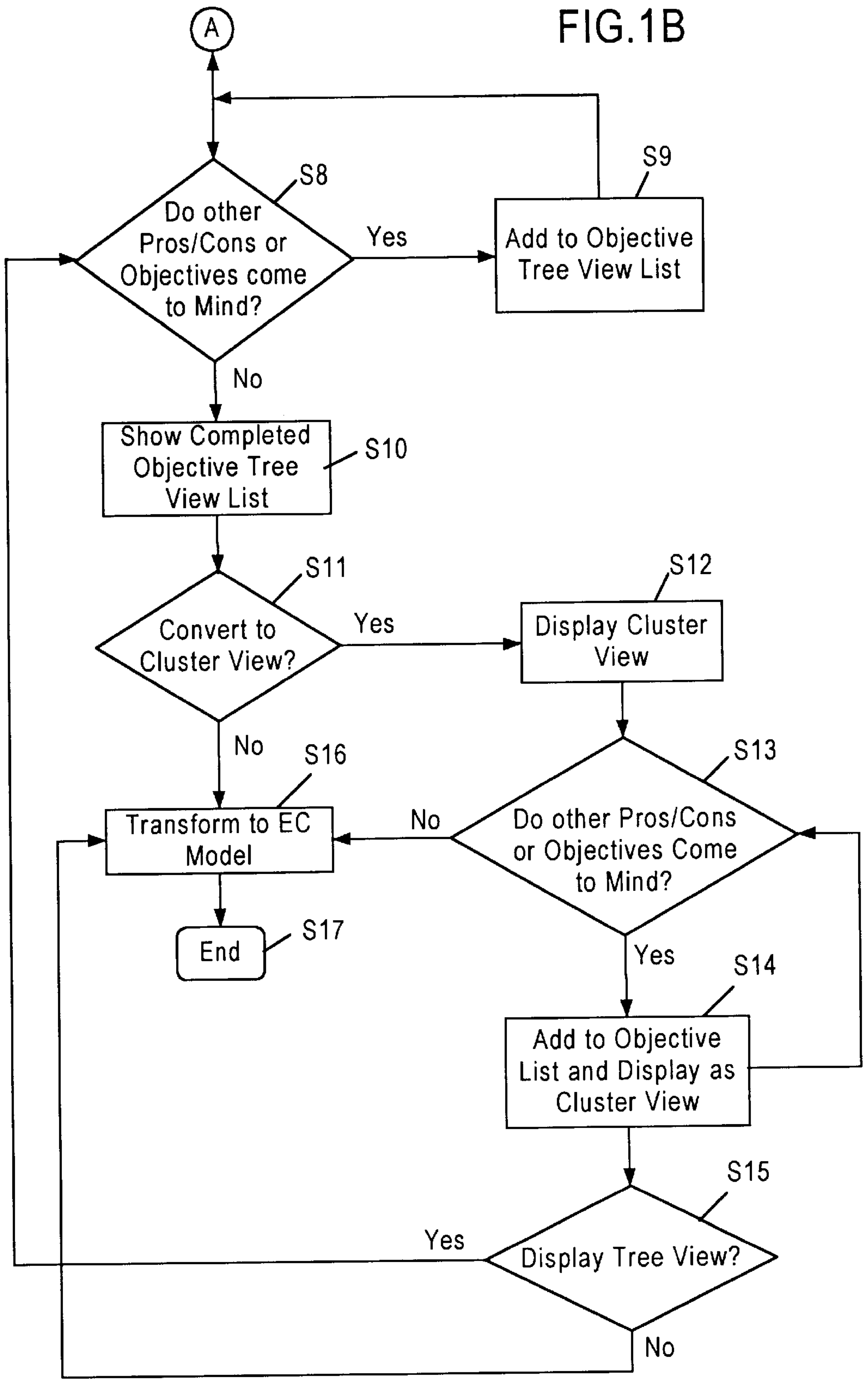

FIGS. 1A and 1B are flow charts of the computer implemented process. This computer implemented process is preferably stored on any computer readable tangible medium, such as a floppy diskette hard drive, computer memory, and the like, for execution by the computer hardware. In describing the computer implemented process with respect to FIGS. 1A and 1B, the interactive user interface display screens affected thereby in FIGS. 2–9 will be simultaneously discussed as well. As indicated in FIG. 1A, Step S1 of the process is for a decision maker (or decision makers) to define alternative solutions to a problem or opportunity (including description and abbreviation) on a computer screen. For example, in deciding whether to expand a company, alternatives might be to (A) Expand the company and build a new sub-division, or (B) Make no plans or further inquiries for expansion at this time, or (C) Wait 6 months, meanwhile collecting additional information. The Alternatives stored in the computer and displayed at reference numeral 1 illustrated in FIG. 2.

Step S2 of the process is for the decision maker(s) to identify pros and cons for each alternative(s). The computer organizes this process by maintaining one screen for each alternative. When the decision maker depresses a button corresponding to an alternative (reference numeral 2 illustrated in FIG. 2), the computer displays an "alternative" screen (FIG. 3) on which pros (reference numeral 3 in FIG. 3) and cons (reference numeral 4 in FIG. 3) for each alternative to be entered by the decision maker into the computer via the illustrated interface, and maintained for manipulation by the computer. A pro for one alternative might be a con for another alternative. For example, a pro for one alternative might be low cost, while a con for another alternative might be high cost.

In Step S3 of the process, the decision maker, guided by the computer, iteratively repeats Steps S1 and S2 until all alternatives have been identified and entered by the decision maker into the computer system. Step S4 of the process is for the computer to combine and list the pros and cons for all alternatives. FIG. 4 shows the pros and cons for all alternatives combined on one screen, with abbreviations illustrated at reference numeral 5 and full descriptions illustrated at reference numeral 6.

Each pro or con will "point" to at least one objective. For example, a pro of reliable points to an objective of reliability. A con of expensive, points to an objective of low cost. Step S5 of the process is for the decision maker to use the computer facilities provided for "converting" each pro and con to one or more objectives by manipulating each pro and con and identifying the objective(s) it points to. If an objective has not yet been identified (based on the pro or con to another alternative), the decision maker can use the computer facilities to drag and drop each pro and con to the "objectives" list according to Step S6. Note: it might be possible for a pro or con to point to more than one objective-for example, a car with a pro of "large" might point to the following objectives: comfort, carrying capacity, safety and fuel economy.

One by one, each pro-con is converted to an objective. For example, the "less time" con illustrated at reference numeral 7 in FIG. 5 is dragged and dropped by the decision maker into the computer maintained objectives list/hierarchy illustrated at reference numeral 8 in FIG. 5 which triggers a prompt box illustrated at reference numeral 9 in FIG. 5 to identify the objective that the pro or con points to. For example, the decision maker responds to the prompt for an objective pointed at by the "less time" con and responds with "more family time" illustrated at reference numeral 10 in FIG. 5 and the computer adds this as an objective.

The result of dropping the "less time" con illustrated at reference numeral 11 in FIG. 6 into the objectives list/hierarchy and converting it to the appropriate objective is illustrated at reference numeral 12 in FIG. 6. Step S7 is a decision point for the decision maker to repeat steps S5 and S6 until all pros and cons have been converted into objectives.

At Steps S8 and S9, the computer allows the decision maker to enter other objectives that come to mind (but do not correspond to any pros or cons) directly into the objectives list/hierarchy, or to construct a hierarchy by clustering related objectives. For example, the computer provides facilities for the decision maker to move (drag/drop) the family time objective illustrated at reference numeral 13 in FIG. 7 so it is clustered under psychological objectives illustrated at reference numeral 14 in FIG. 7. In Step S10, the computer algorithm generates a display of the treeview of the resulting hierarchy of objectives as shown at the bottom of FIG. 7.

In Steps S11 and S12, the computer can convert the treeview into a "clusterview" as shown in FIG. 8. The computer maintained clusterview can be manipulated by the decision maker—rearranging, combining, separating and adding objectives as desired. Other pros/cons or objectives that come to mind are added by the decision maker in Steps S13 and S14. The treeviews and clusterviews are kept in synchronization by the computer and the decision maker can switch between either views in Step S15.

In Step S16, the computer appends the alternatives to the bottom level of the objectives hierarchy to produce an "Evaluation & Choice" model. This is shown with a goal at the top of FIG. 9 illustrated at reference numeral 15, followed by objectives and sub-objectives (to as many levels as desired) illustrated at reference numeral 16 in FIG. 9, and finally followed by the alternatives illustrated at reference numeral 17 in FIG. 9. This display uses, for example, U.S. Pat. No. 4,613,946 for arranging the hierarchical structure, the details of which are incorporated by reference.

The decision maker is then able to utilize this developed list of objectives in the decision making process, and makes a decision responsive thereto. Accordingly the decision making process is greatly facilitated, and the decision maker is able to effectuate a well-reasoned decision, and perform a course of action responsive to the selected decision.

It should be noted that while the above process was described with reference to FIGS. 1–9, in essence, the various steps of the present invention are performed in hardware. Accordingly, each step of the present invention typically generates a physical electrical signal which represents a physical result of a specific step described in the flow charts. The flow chart represents physical electrical signals which are generated and used in subsequent steps of the process. Therefore, the flow chart represents the transforming of physical electrical signals representing physical characteristics such as objectives, alternatives, pros and cons, and quantities into other physical electrical signals also representing transformed physical characteristics.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer system storing computer instructions therein for instructing a computer to perform a process to interact with a user to generate, organize, and display decision alternatives, pros, cons and objectives for evaluating the decision alternatives, said computer system comprising:

a recording medium readable by the computer system; and the computer instructions stored on said recording medium instructing the computer svstem to perform the process, the instructions including:

(a) generating and displaying a first list of the decision alternatives;

(b) for each of the decision alternatives, a decision maker generating a second list of the pros and the cons associated with each of the decision alternatives;

(c) aggregating all the pros and the cons associated with each of the decision alternatives from the second list into a third list of the pros and the cons;

(d) prompting the decision maker to enter each of the pros and the cons into an objectives hierarchy by prompting the decision maker to enter an objective corresponding to at least one of the entered pros and cons;

(e) the decision maker arranging the objectives hierarchy by clustering objectives into objective groups which may include sub-objectives;

(f) displaying the objectives hierarchy in at least one of a treeview and a clusterview in combination with the decision alternatives to allow the decision maker to easily compare the decision alternatives for each lowest level objective; and (g) alternatively adding additional alternatives, pros, cons and objectives, and repeating steps (a)–(f).

2. The computer implemented method according to claim 1, wherein said arranging step (c) further comprises the step of eliminating duplicate pros and/or cons.

3. The computer implemented method according to claim 1, wherein said aggregating step (e) further comprises the step of eliminating duplicate objectives, objective groups, and/or sub-objectives.

4. The computer implemented method according to claim 1, wherein:

said arranging step (c) further comprises the step of eliminating duplicate pros and/or cons, said aggregating step (e) further comprises the step of eliminating duplicate objectives, objective groups, and/or sub-objectives.

5. A computer system storing computer instructions therein for instructing a computer to perform a process to interact with a user to generate, organize, and display decision alternatives, pros, cons and objectives for evaluating the decision alternatives, said computer system comprising:

a recording medium readable by the computer system; and the computer instructions stored on said recording medium instructing the computer system to perform the process, the instructions including:

(a) generating and displaying a first list of the decision alternatives;

(b) for each of the decision alternatives, a decision maker generating a second list of the pros and the cons associated with each of the decision alternatives;

(c) aggregating all the pros and the cons associated with each of the decision alternatives from the second list into a third list of the pros and the cons;

(d) prompting the decision maker to enter an objective corresponding to at least one of the entered pros and cons;

(e) prompting the decision maker to enter each of the pros and the cons into an objectives hierarchy, converting each of the pros and the cons into a corresponding objective; and (f) displaying the objectives hierarchy in at least one of a treeview or a clusterview in combination with the decision alternatives to allow the decision maker to easily compare the decision alternatives for each lowest level objective.

6. The computer implemented method according to claim 5, wherein said arranging step (c) further comprises the step of eliminating duplicate pros and/or cons.

7. The computer implemented method according to claim 5, wherein said aggregating step (e) further comprises the step of eliminating duplicate objectives, objective groups, and/or sub-objectives.

8. The computer implemented method according to claim 5, wherein:

said arranging step (c) further comprises the step of eliminating duplicate pros and/or cons, said aggregating step (e) further comprises the step of eliminating duplicate objectives, objective groups, and/or sub-objectives.

* * * * *